United States Patent
Chen

(10) Patent No.: US 11,477,445 B2
(45) Date of Patent: Oct. 18, 2022

(54) METHODS AND APPARATUSES OF VIDEO DATA CODING WITH TILE GROUPING

(71) Applicant: MediaTek Singapore Pte. Ltd., Singapore (SG)

(72) Inventor: Lulin Chen, San Jose, CA (US)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/726,286

(22) Filed: Dec. 24, 2019

(65) Prior Publication Data
US 2020/0213588 A1 Jul. 2, 2020

Related U.S. Application Data

(60) Provisional application No. 62/785,712, filed on Dec. 28, 2018.

(51) Int. Cl.
| | |
|---|---|
| H04N 19/597 | (2014.01) |
| H04N 19/124 | (2014.01) |
| H04N 19/117 | (2014.01) |
| H04N 19/174 | (2014.01) |
| H04N 19/91 | (2014.01) |
| H04N 19/159 | (2014.01) |
| H04N 19/176 | (2014.01) |

(52) U.S. Cl.
CPC ......... *H04N 19/117* (2014.11); *H04N 19/159* (2014.11); *H04N 19/174* (2014.11); *H04N 19/176* (2014.11); *H04N 19/91* (2014.11)

(58) Field of Classification Search
CPC .. H04N 19/117; H04N 19/159; H04N 19/174; H04N 19/176; H04N 19/91; H04N 19/597; H04N 19/124; H04N 9/119; H04N 19/44
See application file for complete search history.

(56) References Cited

U.S. PATENT DOCUMENTS

| | | | |
|---|---|---|---|
| 2013/0101035 A1* | 4/2013 | Wang | H04N 19/70 375/240.12 |
| 2015/0016504 A1* | 1/2015 | Auyeung | H04N 19/162 375/240.02 |
| 2015/0016539 A1* | 1/2015 | Hattori | H04N 19/137 375/240.24 |
| 2017/0289556 A1* | 10/2017 | Hendry | H04N 19/70 |
| 2019/0364289 A1* | 11/2019 | Hattori | H04N 19/188 |

* cited by examiner

*Primary Examiner* — Patrick E Demosky
(74) *Attorney, Agent, or Firm* — Oblon, McClelland, Maier & Neustadt, L.L.P.

(57) ABSTRACT

Methods and apparatuses for processing video data include receiving input data associated with a current video picture, dividing the current video picture into non-overlapping rectangular tiles, grouping the tiles in the current video picture into tile groups, and encoding or decoding video data in the tile groups within the current video picture. According to one embodiment, each tile group is composed of an integer number of tiles, and shapes of all the tile groups are constrained to be rectangle. According to one embodiment, a flag is used to indicate whether one or more in-loop filtering operations are performed across tile group boundaries.

21 Claims, 5 Drawing Sheets

METHODS AND APPARATUSES OF VIDEO DATA CODING WITH TILE GROUPING

CROSS REFERENCE TO RELATED APPLICATIONS

The present invention claims priority to U.S. Provisional Patent Application, Ser. No. 62/785,712, filed on Dec. 28, 2018, entitled "Flexible tile grouping for VVC". The U.S. Provisional Patent Application is hereby incorporated by reference in its entirety.

FIELD OF THE INVENTION

The present invention relates to video data processing methods and apparatuses for video encoding or video decoding. In particular, the present invention relates to tile grouping in video encoding or decoding.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A coded picture is represented by one or a collection of slices in a raster scan order, a slice is defined as an integer number of CTUs contained in one independent slice segment and subsequent dependent slice segments. The individual CTUs in a slice are processed according to a raster scan order. Each CTU consists of a luma Coding Tree Block (CTB), corresponding chroma CTBs, and syntax elements. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree (QT) partitioning method to adapt to various local motion and texture characteristics. The quadtree syntax of a CTU specifies the size and positions of its luma and chroma Coding Blocks (CBs).

The prediction decision is made at the CU level, where each CU is either coded by inter picture prediction or intra picture prediction. Once the splitting of CU hierarchical tree is done, each CU is subject to further split into one or more Prediction Units (PUs) according to a PU partition type for prediction. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After obtaining a residual signal generated by the prediction process, residual data of the residual signal belong to a CU is split into one or more Transform Units (TUs) according to a Residual QuadTree (RQT) block partitioning structure for transforming the residual data into transform coefficients for compact data representation. The TU is a basic representative block for applying transform and quantization on the residual signal in the encoding process. For each TU, a transform matrix having the same size as the TU is applied to the residual signal to generate the transform coefficients, and these transform coefficients are quantized and conveyed to the decoder on a TU basis. An integer transform is applied to a transform block and the level values of the quantized coefficients together with the other side information are entropy coded in the video bitstream.

Besides partitioning a video picture into one or more slices, the video picture coded in the HEVC standard can also be divided into independent rectangular regions, called tiles. A tile is defined as a rectangular region of CTUs within a particular tile column and a particular tile row in the video picture. A tile is composed of a predetermined number of CTUs. CTUs are decoded in a raster scan order inside each tile and the tiles are decoded in the raster scan order inside a video picture. Compared to the normal raster scan decoding order for processing CTUs in a video picture, tiles affect the availability of the neighboring coding units for prediction and entropy coding. FIG. 1A illustrates an example of partitioning a video picture with 11 by 9 luma CTBs into two tiles and one slice according to the HEVC standard. The size of a left tile in the video picture is 5×9 luma CTBs and the size of a right tile is 6×9 luma CTBs as shown in FIG. 1A. The slice is further divided into five segments including one independent slice segment 102 and four dependent slice segments 104, 106, 108, and 110. In the case shown in FIG. 1A, one slice contains multiple tiles, it is also valid to have one tile containing multiple slices, and an example of one tile containing multiple slices is shown in FIG. 1B. A video picture shown in FIG. 1B also has 11×9 luma CTBs and it is divided into two tiles and three slices. A first slice is composed of an independent slice segment 112 and a dependent slice segment 114, and a second slice is composed of an independent slice segment 116 and a dependent slice segment 118. A third slice completely overlaps with the right tile and is composed of an independent slice segment 120 and a dependent slice segment 122. Each dependent slice segment is encoded or decoded dependent on its corresponding independent slice segment.

The tile division provides a number of advantages, such as increasing parallel friendliness by enabling improved coding processing for parallel architectures, as compared to previous slice based partitioning. In addition, tiles facilitate reduced line buffer memory, and additional region-of-interest functionality. Slices and tiles are two separate partition aspects of a video picture, however, slices and tiles are lack of interactive performance improvement and employing both slices and tiles introduces coding complexity in practice.

Joint Video Expert Team (JVET) of ITU-T SG16 WP3 and ISO/IEC JTC1/SC29/WG11 (MPEG) are currently in the process of establishing the next-generation video coding standard Versatile Video Coding (VVC). Some promising new coding tools have been adopted into VVC Working Draft (WD) 3. In one proposal adopted in the JVET meeting, a tile group is specified in substitution of a classic slice in the HEVC standard. A tile group is a sequence of tiles in a raster scan order within a picture, and a tile is a sequence of CTUs that covers a rectangular region of the picture. FIG. 2 shows an example of tile partitioning using three columns separated by column boundaries and four rows separated by row boundaries. The video picture in FIG. 2 is divided into 12 tiles and these 12 tiles are grouped into 3 tile groups according to a raster scan order. In this example shown in FIG. 2, the video picture is composed of 18×12 luma CTBs and each tile is composed of 6×3 luma CTBs. A first tile group 202 is composed of the first 2 tiles (with light gray background), a second tile group 204 is composed of subsequent 5 tiles (with white background), and a third tile group 206 is composed of remaining 5 tiles (with dark gray background). The following pseudo codes illustrate information signaled in a picture parameter set, tile group header, and general tile group data syntax for realizing the tile group proposed in the JVET meeting. For each tile group, a syntax element num_tiles_in_tile_group_minus1 signaled in the tile group header represents the number of tile within the tile group.

| Picture parameter set RBSP syntax | |
|---|---|
| | Descriptor |
| pic_parameter_set_rbsp( ) { | |
|     pps_pic_parameter_set_id | ue(v) |
|     pps_seq_parameter_set_id | ue(v) |
|     transform_skip_enabled_flag | u(1) |
|     single_tile_in_pic_flag | u(1) |
|     if( !single_tile_in_pic_flag ) { | |
|         num_tile_columns_minus1 | ue(v) |
|         num_tile_rows_minus1 | ue(v) |
|         uniform_tile_spacing_flag | u(1) |
|         if( !uniform_tile_spacing_flag ) { | |
|             for( i = 0; i < num_tile_columns_minus1; i++ ) | |
|                 tile_column_width_minus1[ i ] | ue(v) |
|             for( i = 0; i < num_tile_rows_minus1; i++ ) | |
|                 tile_row_height_minus1[ i ] | ue(v) |
|         } | |
|         loop_filter_across_tiles_enabled_flag | u(1) |
|     } | |
|     rbsp_trailing_bits( ) | |
| } | |

| Tile group header syntax | |
|---|---|
| | Descriptor |
| tile_group_header( ) { | |
|     tile_group_pic_parameter_set_id | ue(v) |
|     if( NumTilesInPic > 1 ) { | |
|         tile_group_address | u(v) |
|         num_tiles_in_tile_group_minus1 | ue(v) |
|     } | |
|     tile_group_type | ue(v) |
|     if (tile_group_type != I ) { | |
|         log2_diff_ctu_max_bt_size | ue(v) |
|         if( sps_sbtmvp_enabled_flag ) { | |
|             sbtmvp_size_override_flag | u(1) |
|             if( sbtmvp_size_override_flag ) | |
|                 log2_sbtmvp_active_size_minus2 | u(3) |
|     } | |
|     if( sps_temporal_mvp_enabled_flag ) | |
|         tile_group_temporal_mvp_enabled_flag | u(1) |
|     if( tile_group_type == B ) | |
|         mvd_l1_zero_flag | u(1) |
|     if( tile_group_temporal_mvp_enabled_flag) { | |
|         if( tile_group_type == B ) | |
|             collocated_from_l0_flag | u(1) |
|         } | |
|         six_minus_max_num_merge_cand | ue(v) |
|     } | |
|     dep_quant_enabled_flag | u(1) |
|     if( !dep_quant_enabled_flag ) | |
|         sign_data_hiding_enabled_flag | u(1) |
|     if( num_tiles_in_tile_group_minus1 > 0 ) { | |
|         offset_len_minus1 | ue(v) |
|         for( i = 0; i < num_tiles_in_tile_group_minus1; i++ ) | |
|             entry_point_offset_minus1[ i ] | u(v) |
|     } | |
|     byte_alignment( ) | |
| } | |

| General tile group data syntax | |
|---|---|
| | Descriptor |
| ```
tile_group_data( ) {
    tileIdx = tile_group_address
    for( i = 0; i <= num_tiles_in_tile_group_minus1; i++, tileIdx++ ) {
        ctbAddrInTs = FirstCtbAddrTs[ tileIdx ]
        for( j = 0; j < NumCtusInTile[ tileIdx ]; j++, ctbAddrInTs++ ) {
            CtbAddrInRs = CtbAddrTsToRs[ ctbAddrInTs ]
            coding_tree_unit( )
        }
        end_of_tile_one_bit /* equal to 1 */
        if( i < num_tiles_in_tile_group_minus1 )
            byte_alignment( )
    }
}
``` | ae(v) |

BRIEF SUMMARY OF THE INVENTION

Methods and apparatuses of processing video data in a video coding system receive input data associated with a current video picture, divide the current video picture into non-overlapping rectangular tiles, group the tiles in the current video picture into one or more tile groups, and encode or decode video data in the tile groups within the current video picture. Each tile group contains an integer number of tiles and shapes of all the tile groups are constrained to be rectangle. In some embodiments, tiles within each tile group are processed in a raster scan order. In one embodiment, each tile contains a predetermined number of CTUs, and a size of a CTU is fixed so a size of a tile is also fixed.

In some embodiments, a first flag is signaled in or parsed from a video bitstream indicating whether one or more filtering operations are performed across tile group boundaries. The one or more filtering operations are performed across tile group boundaries between the one or more tile groups in the current video picture if the first flag specifies the one or more filtering operations can be performed across tile group boundaries. If the first flag specifies the one or more filtering operations cannot be performed across tile group boundaries, the one or more filtering operations are performed only within each tile group but not across any tile group boundaries. Some examples of the filtering operations include one or a combination of deblocking filter, sample adaptive offset filter, and adaptive loop filter operations. The first flag is signaled in or parsed from a sequence, picture, or slice level of the video bitstream. For example, the first flag is signaled in or parsed from a Sequence Parameter Set, Picture Parameter Set, or slice header. In one embodiment, a second flag is also signaled in or parsed from the video bitstream indicating whether one or more filtering operations are performed across tile boundaries. The one or more filtering operations are performed across tile boundaries between the tiles in the current video picture if the second flag specifies the one or more filtering operations can be performed across tile boundaries. If the second flag specifies the one or more filtering operations cannot be performed across tile boundaries, the one or more filtering operations are performed only within each tile but not across the tiles. In one embodiment, the first flag is signaled or parsed only if the second flag indicates the one or more filtering operations are performed across tile boundaries. Two syntax elements are signaled or parsed for each tile group according to some embodiments, one represents a width of the tile group in a number of tiles, and another represents a height of the tile group in a number of tiles. A size of each tile group is signaled or derived using these two syntax elements.

In one embodiment of the present invention, the video coding system signals or parses a rectangular tile group flag, and all the tile groups are either constrained to have rectangular shapes when the rectangular tile group flag is true or the tile groups are not constrained to have rectangular shapes when the rectangular tile group flag is false. A size of each tile group is signaled or derived using two syntax elements if the rectangular tile group flag is true, and the two syntax elements of a tile group represent a width of the tile group and a height of the tile group respectively. A size of each tile group is signaled or derived using one syntax element if the rectangular tile flag is false, and the syntax element of a tile group represents a number of tiles within the tile group. In some embodiments, the tile groups in the current video pictures are not constrained to have a same size.

In some other embodiments, methods and apparatuses of processing video data in a video coding system include receiving input data associated with a current video picture, dividing the current video picture into non-overlapping rectangular tiles, grouping the tiles into one or more tile groups, signaling or parsing a first flag indicating whether one or more filtering operations are performed across tile group boundaries between the tile groups, performing the filtering operations according to the first flag, and encoding or decoding video data in the tile groups within the current video picture. Each tile group contains an integer number of tiles. The one or more filtering operations are performed across tile group boundaries between the tile groups if the first flag specifies filtering can be performed across tile group boundaries. The one or more filtering operations are performed only within each tile group if the first flag specifies filtering cannot be performed across tile group boundaries. Some examples of the filtering operations include one or a combination of deblocking filter, sample adaptive offset filter, and adaptive loop filter operations. The first flag may be signaled in or parsed from a sequence level, picture level, or slice level of a video bitstream. In some embodiment, a second flag is signaled or parsed to indicate whether the one or more filtering operations are performed across tile boundaries. The first flag is signaled or parsed only if the second flag indicates the one or more filtering operations are performed across tile boundaries. The tile groups in the current video picture may be raster scan tile groups or rectangular tile groups, where shapes of the rectangular tile groups are constrained to be rectangle or square.

Aspects of the disclosure further provide an apparatus for the video coding system encoding or decoding video data by receiving input data associated with a current video picture, dividing the current video picture into non-overlapping rectangular tiles, grouping the tiles in the current video picture into one or more rectangular tile groups, and encoding or decoding video data in the rectangular tile groups within the current video picture. Each of the rectangular tile groups contains an integer number of tiles and shapes of all the rectangular tile groups are constrained to be rectangle.

Aspects of the disclosure further provide a non-transitory computer readable medium storing program instructions for causing a processing circuit of an apparatus to perform video coding process for processing video data belong to rectangular tile groups in a current video picture. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Rectangular Tile Group

Figure 1A:
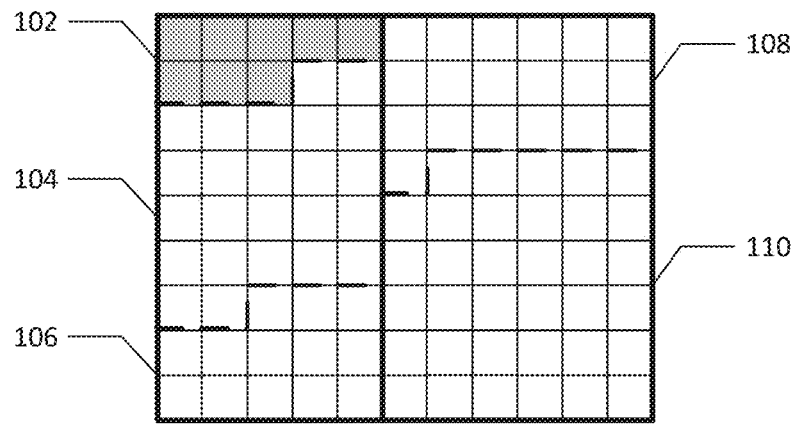
FIG. 1A illustrates an example of partitioning a video picture into two tiles and one slice according to the HEVC standard.
Figure 1B:
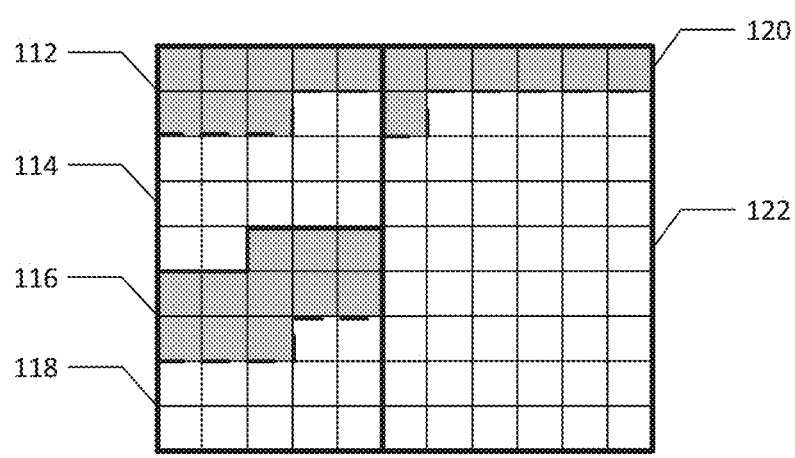
FIG. 1B illustrates an example of partitioning a video picture into two tiles and three slices according to the HEVC standard.
Figure 2:
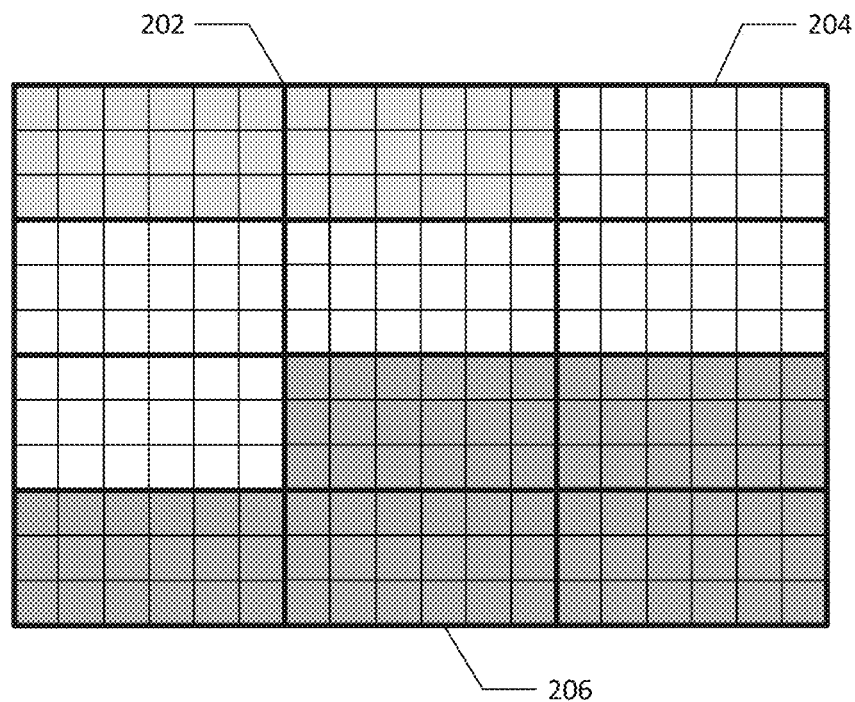
FIG. 2 illustrates an example of partitioning a video picture into twelve tiles and grouping these twelve tiles into three tile groups according to a raster scan order.
Figure 3:
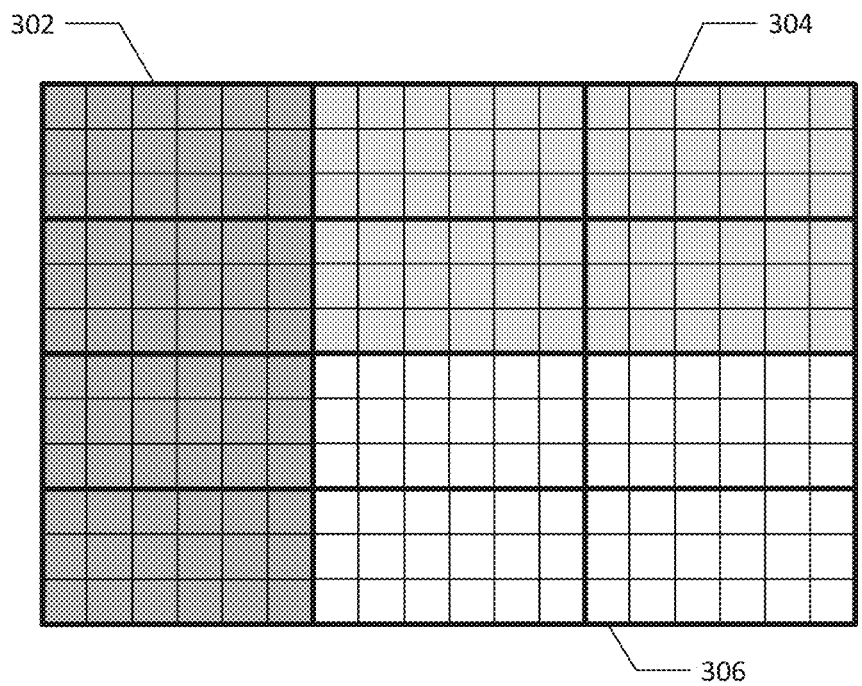
FIG. 3 illustrates an example of partitioning a video picture into twelve tiles and grouping these twelve tiles into three tile groups according to an embodiment of the present invention

Embodiments of the present invention employ rectangular tile groups to replace the traditional tiles and slices used in the HEVC standard in addition to the previously proposed raster scan tile groups. A rectangular tile group may also be referred to as a slice as it may use the existing slice header. A rectangular tile group contains an integer number of tiles and a shape of the rectangular tile group must be rectangle. In some embodiments, square may also be considered as a type of a rectangle. The rectangular tile groups in a video picture may have different sizes or areas. Each tile in the rectangular tile group contains a predetermined number of CTUs, for example, each tile contains 5×4 CTUs. An example of dividing a video picture into 12 tiles according to an embodiment of the present invention is shown in FIG. 3. The 12 tiles in FIG. 3 are aggregated in 3 rectangular tile groups 302, 304, and 306. The rectangular tile group 302 contains 1×4 tiles (with dark gray background), the rectangular tile group 304 contains 2×2 tiles (with light gray background) and the rectangular tile group 306 also contains 2×2 tiles (with white background). Each of the rectangular tile groups in this example is composed of four tiles, but the sizes of the rectangular tile groups are not all the same. The size of a tile in this example is fixed to 6×3 CTUs. The encoding or decoding processing order is the rectangular tile group 302, then the rectangular tile group 304, and lastly the rectangular tile group 306. In some embodiments, tiles within each rectangular tile group are processed in a raster scan order, and CTUs within each tile are also processed in a raster scan order. The rectangular tile group is different from the conventional tile group as shown in FIG. 2 as the shape of each rectangular tile group is constrained to be square or rectangle. The video picture in FIG. 2 is partitioned into three tile groups by a raster scan order so the shapes of the three conventional tile groups are not restricted to be rectangle or square. In some embodiments, a picture may be divided into several rectangular subpictures and employing rectangular tile groups can be applied to such use case.

Flag for Filtering Processing Across Tile Group Boundaries

Some embodiments of a video encoder or video decoder divide a video picture into one or more tile groups and signal or parse a first flag indicating whether one or more filtering operations are performed across tile group boundaries. The one or more filtering operations include one or a combination of Deblocking Filter (DF), Sample Adaptive Offset (SAO) filter, and Adaptive Loop Filter (ALF) according to some embodiments of the present invention. For example, the SAO process is performed across tile group boundaries or the SAO process is independently performed within each tile group depending on the value of the first flag. In some embodiments, the first flag indicating whether one or more filtering operations are performed across tile group boundaries may be transmitted in a sequence level, picture level, or slice level such as Sequence Parameter Set (SPS), Picture Parameter Set (PPS), or slice header. In one embodiment of employing the first flag to control one or more filtering operations, the tile groups are rectangular tile groups as shapes of the rectangular tile groups are constrained to be rectangle or square. In another embodiment of employing the first flag, the tile groups are raster scan tile group as shapes of the raster scan tile groups are not constrained to be rectangle nor square. In some embodiments of the present invention, a second flag indicating whether one or more filtering operations are performed across tile boundaries is also signaled or parsed. For example, the second flag is signaled in or parsed from a sequence level, picture level, or slice level. In one embodiment, the first flag indicating whether one or more filtering operations are performed across tile group boundaries is signaled or parsed only if the second flag indicates one or more filtering operations can be performed across tile boundaries. In an exemplary embodiment, by setting both the first and second flags to true, one or more in-loop filtering operations may be performed across both tile and tile group boundaries. By setting the first flag to false and the second flag to true, one or more in-loop filtering operations are performed across tile boundaries but not tile group boundaries. By setting both the first and second flags to false, one or more in-loop filtering operations are not performed across both tile boundaries and tile group boundaries.

Exemplary Pseudo Codes for Employing Rectangular Tile Group

The pseudo codes in the following demonstrates an embodiment of employing rectangular tile groups to divide video pictures for encoding or decoding. In the following pseudo codes, two flags are signaled in the picture parameter set to decide whether the in-loop filter operation is performed across tile boundaries and tile group boundaries respectively. The syntax additions and modifications in picture parameter set RBSP syntax, tile group header syntax, and general tile group data syntax are highlighted as follows.

| Picture parameter set RBSP syntax | |
|---|---|
| | Descriptor |
| pic_parameter_set_rbsp( ) { | |
|     pps_pic_parameter_set_id | ue(v) |
|     pps_seq_parameter_set_id | ue(v) |
|     transform _skip_enabled_flag | u(1) |
|     single_tile_in_pic_flag | u(1) |
|     if( !single_tile_in_pic_flag ) { | |
|         num_tile_columns_minus1 | ue(v) |
|         num_tile_rows_minus1 | ue(v) |
|         uniform_tile_spacing_flag | u(1) |
|         if( !uniform_tile_spacing_flag ) { | |
|             for( i = 0; i < num_tile_columns_minus1; i++ ) | |
|                 tile_column_width_minus1[ i ] | ue(v) |
|             for( i = 0; i < num_tile_rows_minus1; i++ ) | |
|                 tile_row_height_minus1[ i ] | ue(v) |
|         } | |
|         loop_filter_across_tiles_enabled_flag | u(1) |
|     if(loop_filter_across_tiles_enabled_flag) | |
|         loop_filter_across_tile_groups_enabled_flag | u(1) |
|     } | |
|     rbsp_trailing_bits( ) | |
| } | |

| Tile group header syntax | |
|---|---|
| | Descriptor |
| tile_group_header( ) { | |
|     tile_group_pic_parameter_set_id | ue(v) |
|     if( NumTilesInPic > 1 ) { | |
|         tile_group_address | u(v) |
|     rectangular_tile_group_enabled_flag | u(1) |
|     If( rectangular_tile_group_enabled_flag ) { | |
|     num_tile_colums_in_tile_group_minus1 | ue(v) |
|     num_tile_rows_in_tile_group_minus1 | ue(v) |
|     } else | |
|         num_tiles_in_tile_group_minus1 | ue(v) |
|     } | |
|     tile_group_type | ue(v) |
|     if (tile_group_type != I ) { | |
|         log2_diff_ctu_max_bt_size | ue(v) |
|         if( sps_sbtmvp_enabled_flag ) { | |
|             sbtmvp_size_override_flag | u(1) |
|             if( sbtmvp_size_override_flag ) | |
|                 log2_sbtmvp_active_size_minus2 | u(3) |
|         } | |
|         if( sps_temporal_mvp_enabled_flag ) | |
|             tile_group_temporal_mvp_enabled_flag | u(1) |

| Tile group header syntax | Descriptor |
|---|---|
| ```
    if( tile_group_type = = B )
        mvd_l1_zero_flag
    if( tile_group_temporal_mvp_enabled_flag ) {
        if( tile_group_type = = B )
            collocated_from_l0_flag
    }
    six_minus_max_num_merge_cand
}
dep_quant_enabled_flag
if( !dep_quant_enabled_flag )
    sign_data_hiding_enabled_flag
if( num_tiles_in_tile_group_minus1 > 0 ) {
    offset_len_minus1
    for( i = 0; i < num_tiles_in_tile_group_minus1; i++ )
        entry_point_offset_minus1[ i ]
}
byte_alignment( )
}
``` | u(1)<br><br>u(1)<br>ue(v)<br><br>u(1)<br><br>u(1)<br><br>ue(v)<br><br>u(v) |

| General tile group data syntax | Descriptor |
|---|---|
| ```
tile_group_data( ) {
    If( rectangular_tile_group_enabled_flag ) {
        tileIdx = tile_group_address
        for( m = 0; m < num_tile_rows_in_tile_group_minus1; m++, tileIdx++ )
            for( i = 0; i <= num_tile_columns_in_tile_group_minus1; i++, tileIdx++ ) {
                ctbAddrInTs = FirstCtbAddrTs[ tileIdx ]
                for( j = 0; j < NumCtusInTile[ tileIdx ]; j++, ctbAddrInTs++ ) {
                    CtbAddrInRx = CtbAddrTsToRs[ ctbAddrInTs ]
                    coding_tree_unit( )
                }
                end_of_tile_one_bit  /* equal to 1 */
                if( I < num_tiles_in_tile_group_minus1 )
                    byte_alignment( )
            }
            tileIdx+= num_tile_columns_minus1
    }
    } else {
        tileIdx = tile_group_address
        for( i = 0; i <= num_tiles_in_tile_group_minus1; i++, tileIdx++ ) {
            ctbAddrInTs = FirstCtbAddrTs[ tileIdx ]
            for( j = 0; j < NumCtusInTile[ tileIdx ]; j++, ctbAddrInTs++ ) {
                CtbAddrInRs = CtbAddrTsToRs[ ctbAddrInTs ]
                coding_tree_unit( )
            }
            end_of_tile_one_bit  /* equal to 1 */
            if( i < num_tiles_in_tile_group_minus1 )
                byte_alignment( )
        }
    }
}
``` | <br><br><br><br><br><br><br><br><br><br>ae(v)<br><br><br><br><br><br><br><br><br><br><br>ae(v) |

The flag loop_filter_across_tile_groups_enabled_flag is an example of the first flag indicating whether a filtering operation is performed across tile group boundaries. The flag loop_filter_across_tile_group_enabled_flag in this embodiment is signaled in a current Picture Parameter Set (PPS), the flag equals to 1 specifying that one or more in-loop filtering operations are performed across tile group boundaries in pictures referring to the current PPS, and the flag equals to 0 specifying that one or more in-loop filtering operations cannot be performed across tile group boundaries in pictures referring to the current PPS. Some examples of the in-loop filtering operation are deblocking filter, sample adaptive offset filter, and adaptive loop filter operations. When the flag loop_filter_across_tile_group_enabled_flag is not present, the value of this flag is inferred to be equal to 1. The flag loop_filter_across_tiles_enabled_flag is an example of the second flag indicating whether a filtering process is performed across tile boundaries. The flag loop_filter_across_tiles_enabled_flag in this embodiment is also signaled in the current PPS, the flag equals to 1 specifying that one or more in-loop filtering operations are performed across tile boundaries except tile group boundaries in pictures referring to the current PPS, and the flag equals to 0 specifying that one or more in-loop filtering operations cannot be performed across tile boundaries. The flag loop_filter_across_tiles_enabled_flag is inferred to be equal to 1 if it is not present. In cases when the flag loop_filter_across_tiles_enabled_flag is equal to 0, the flag loop_filter_across_ tile_groups_enabled_flag shall be 0, so the in-loop filter operation cannot be performed across the tile group boundaries if the in-loop filter operation is not allowed to be performed across the tile boundaries.

In this embodiment, the tile groups may be restricted to have rectangular shapes or may not have the restriction on the shape. The flag rectangular_tile_group_enabled_flag is signaled in a current tile group header. This flag equals to 1 specifying that the area of the current tile group is in rectangular shape, and this flag equals to 0 specifying that the current tile group contains tiles in a raster scan order of a picture. When this flag rectangular tile_group_enabled_flag is equal to 1, the size of the current tile group is signaled using two syntax elements num_tile_columns_in_ tile_group_minus1 and num_tile_rows_in_tile_group_minus1, otherwise when the flag rectangular tile_group_enabled_flag is equal to 0, the size of the current tile group is signaled using one syntax element num_tiles_in_tile_group_ minus1. The syntax element num_tile_columns_in_tile_group_minus1 represents a width of the current tile group by counting the number of tiles in the horizontal dimension of the current tile group minus 1. The syntax element num_tile_rows_in_tile_group_minus1 represents a height of the current tile group by counting the number of tiles in the vertical dimension of the current tile group minus 1. For example, num_tile_columns_in_tile_group_minus1 equals to 3 and num_tile_rows_in_tile_group_minus1 equal to 2 indicating that the size of the current tile group is equal to 4×3 tiles. The syntax element num_tile_columns_in_tile_group_minus1 is constrained in the range of 0 to PicWidthInCtbsY−1 inclusively and the syntax element num_tile_rows_in_tile_group_minus1 is constrained in the range of 0 to PicHeightInCtbsY−1 inclusively. When any of the syntax elements num_tile_columns_in_tile_group_minus1 and num_tile_rows_in_tile_group_minus1 is not represent, the value is inferred to be equal to 0.

Exemplary Flowchart

Figure 4:
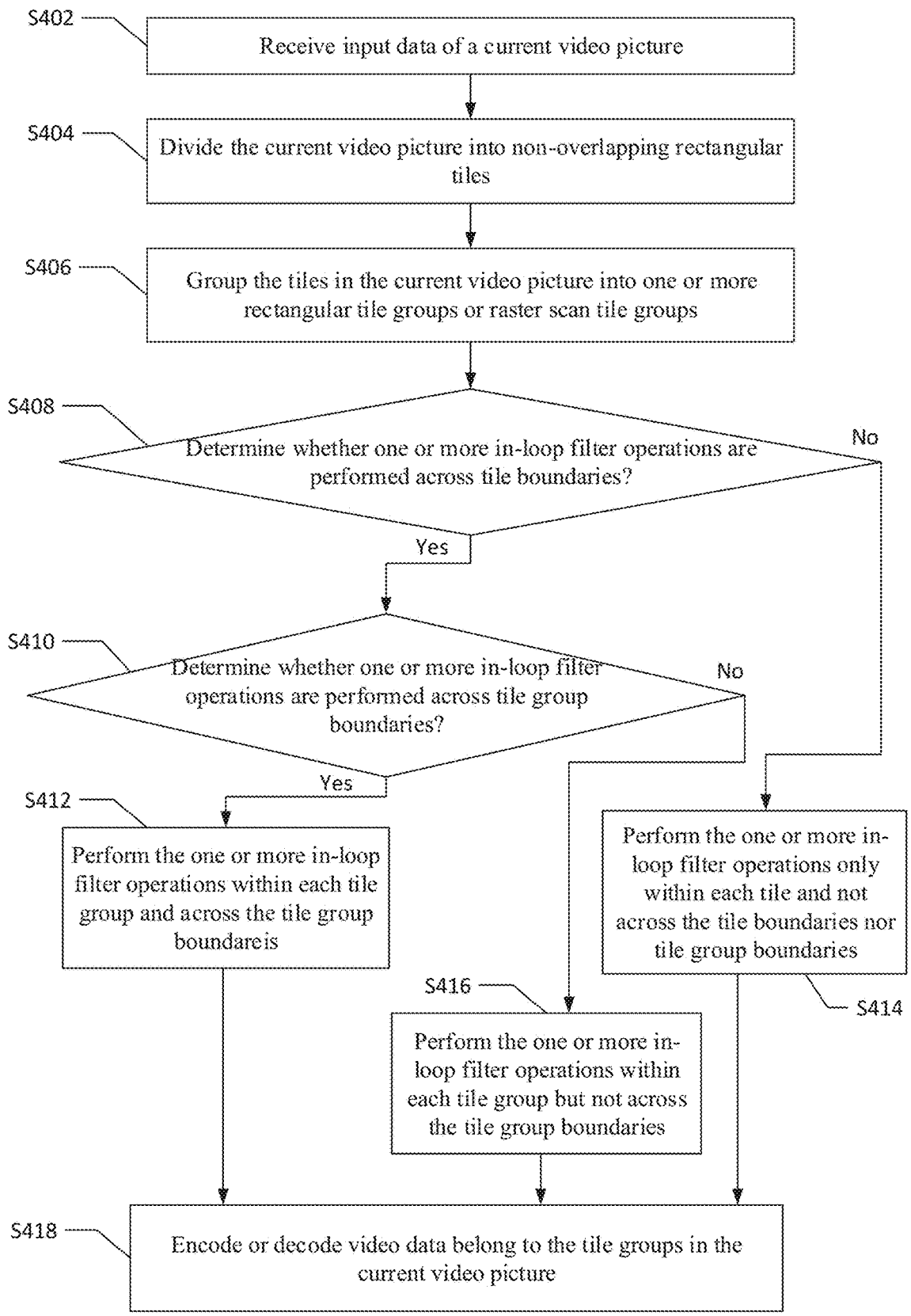
FIG. 4 is a flowchart illustrating an embodiment of the present invention partitioning a current video picture into tiles and grouping the tiles into one or more rectangular tile groups.

FIG. 4 is a flowchart illustrating embodiments of the present invention processing a video picture divided into rectangular tile groups in a video coding system. The video coding system receives input data of a current video picture in step S402, and the current video picture is partitioned into non-overlapping rectangular tiles for video encoding or decoding in step S404. For example, each tile contains a predetermined number of coding tree units. The video coding system groups the tiles in the current video picture into one or more rectangular tile groups or raster scan tile groups in step S406, where each rectangular tile group contains an integer number of tiles and a size of the rectangular tile group is represented by a width in unit of tiles and a height in unit of tiles. In step S408, the video coding system checks whether one or more in-loop filter operations are performed across tile boundaries between the tiles. Embodiments of the in-loop filter operations include one or a combination of deblocking filter, sample adaptive offset filter, and adaptive loop filter operations. In step S410, the video coding system further checks whether the one or more in-loop filter operations are performed across tile group boundaries between tile groups when filtering across the tile boundaries is allowed in step S408. In step S412, the one or more in-loop filter operations are performed within each tile group and across the tile group boundaries if filtering across the tile group boundaries is also allowed in step S410. In cases when the one or more in-loop filtering operations cannot be performed across tile boundaries according to step S408, the video coding system only performs the one or more in-loop filtering operations within each tile and not across the tile boundaries nor the tile group boundaries in step S414. In step S416, the one or more in-loop filter operations are performed within each tile group but not across any tile group boundary if filtering across the tile group boundaries is not allowed in step S410. In one embodiment, the video coding system assumes the one or more in-loop filter operations are always performed across tile boundaries between the tiles, and the video coding system only checks whether the one or more in-loop filter operations are performed across the tile group boundaries. The tile groups in the current video picture are encoded or decoded in step S418.

Figure 5:
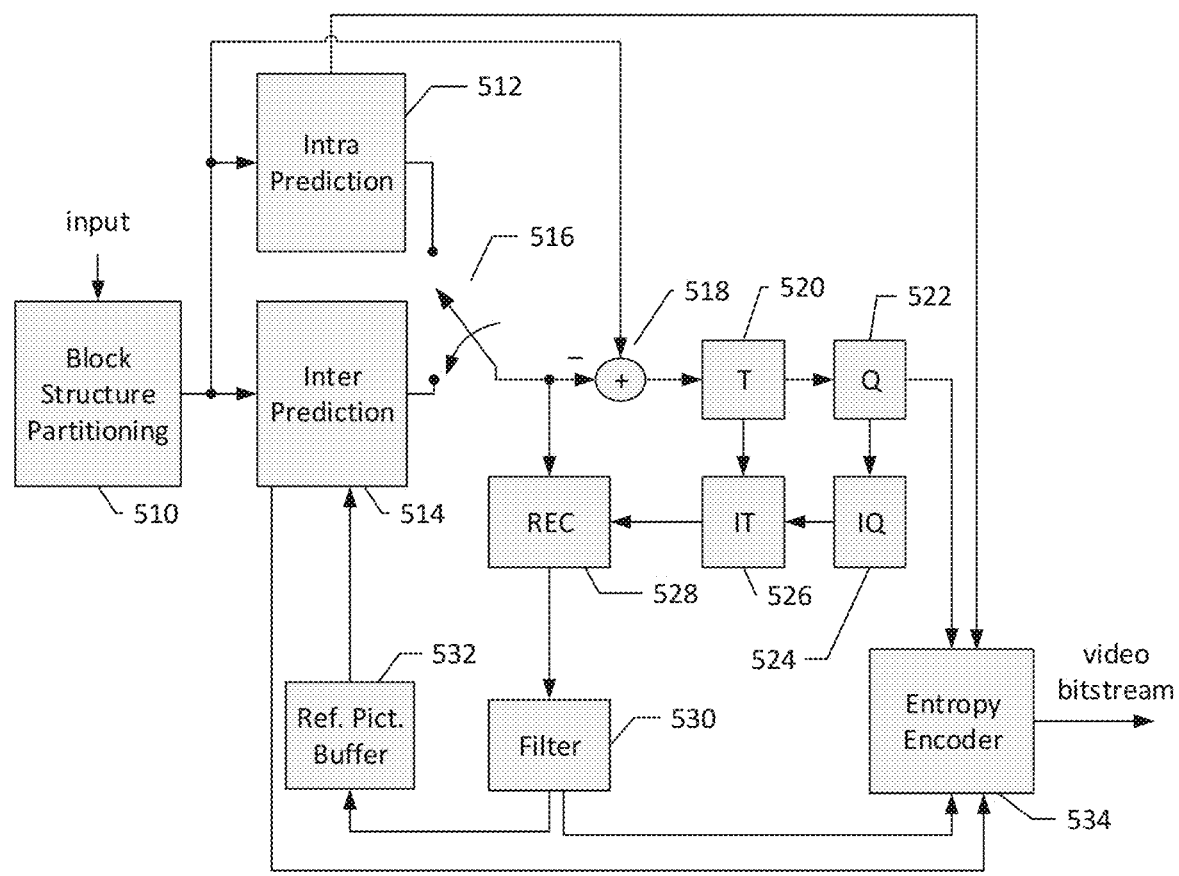
FIG. 5 illustrates an exemplary system block diagram for a video encoding system incorporating the video data processing method according to embodiments of the present invention.

FIG. 5 illustrates an exemplary system block diagram for a Video Encoder 500 implementing embodiments of the present invention. A Block Structure Partitioning module 510 divides a current video picture into non-overlapping rectangular tiles, and these rectangular tiles are grouped into tile groups. Shapes of the tile groups are constrained to be rectangle including square. An Intra Prediction module 512 provides intra predictors based on reconstructed video data of the current video picture. An Inter Prediction module 514 performs motion estimation (ME) and motion compensation (MC) to provide predictors based on referencing video data from other video picture or pictures. A switch 516 selects a predictor from either the Intra Prediction module 512 or Inter Prediction module 514 to supply to an Adder 518 to form residues. The residues are further processed by a Transformation module (T) 520 followed by a Quantization module (Q) 522. The Quantization module 522 receives transform coefficients of each transform block from the Transformation module 520, and performs a quantization processing to the transform coefficients according to quantization parameters. The transformed coefficient levels are then encoded by an Entropy Encoder 534 to form a video bitstream. The video bitstream is then packed with side information. The transformed and quantized residual signal is processed by an Inverse Quantization module (IQ) 524 and an Inverse Transformation module (IT) 526 to recover the prediction residues. As shown in FIG. 5, the residues are recovered by adding back to the selected predictor at a Reconstruction module (REC) 528 to produce reconstructed video data. The reconstructed video data may be stored in a Reference Picture Buffer (Ref. Pict. Buffer) 532 and used for prediction of other pictures. The reconstructed video data from the REC module 528 may be subject to various impairments due to the encoding processing, consequently, an In-loop Processing Filter (Filter) 530 is applied to the reconstructed video data before storing in the Reference Picture Buffer 532 to further enhance picture quality. In some embodiments, the Filter 530 performs an in-loop filtering operation across tile boundaries and tile group boundaries, across tile boundaries but not across tile group boundaries, or not across both tile and tile group boundaries. Two flags indicating whether the in-loop filtering operation is performed across the tile boundaries and the tile group boundaries respectively are provided to the Entropy Encoder 534 for incorporation into the video bitstream.

Figure 6:
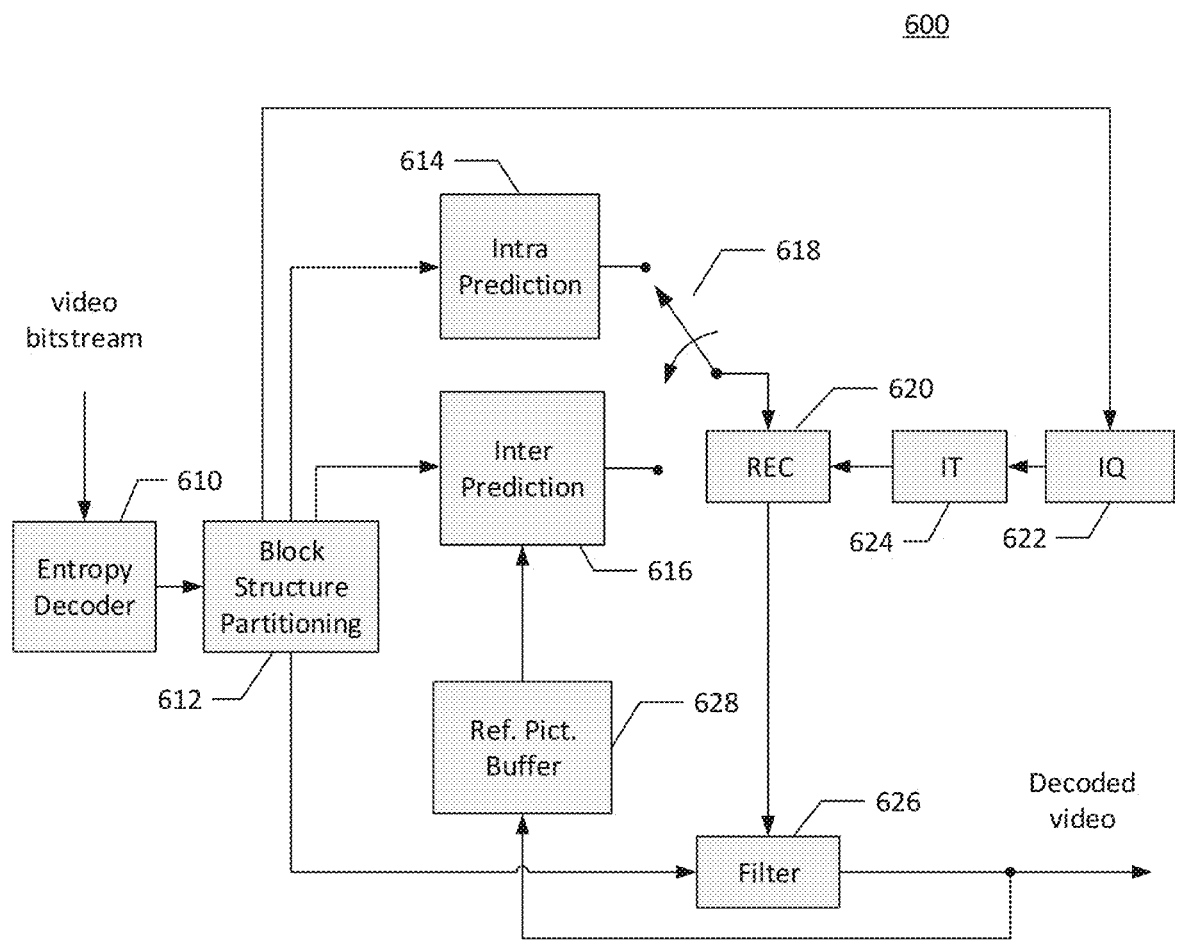
FIG. 6 illustrates an exemplary system block diagram for a video decoding system incorporating the video data processing method according to embodiments of the present invention.

A corresponding Video Decoder 600 for decoding the video bitstream generated by the Video Encoder 500 of FIG. 5 is shown in FIG. 6. The video bitstream is the input to the Video Decoder 600 and is decoded by an Entropy Decoder 610 to parse and recover the transformed and quantized residual signal and other system information. A Block Structure Partitioning module 612 divides a current video picture into non-overlapping square tiles and these tiles are grouped into rectangular tile groups for later processing. The decoding process of the Decoder 600 is similar to the reconstruction loop at the Encoder 500, except the Decoder 600 only requires motion compensation prediction in an Inter Prediction module 616. Each block is decoded by either an Intra Prediction module 614 or Inter Prediction module 616. A Switch 618 selects an intra predictor from the Intra Prediction module 614 or an Inter predictor from the Inter Prediction module 616 according to decoded mode information. The transformed and quantized residual signal is recovered by an Inverse Quantization module (IQ) 622 and an Inverse Transformation module (IT) 624. The Inverse Quantization module 622 applies an inverse quantization processing according to quantization parameters of transform blocks to generate scaled transform coefficients and the Inverse Transform module 624 converts the scaled transform coefficients from a frequency domain back to a sample domain. The recovered residual signal is reconstructed by adding back the selected predictor in a Reconstruction (REC) module 620 to produce reconstructed video. The reconstructed video is further processed by an In-loop Processing Filter (Filter) 626 to generate final decoded video. In some embodiments, one flag is parsed by the Entropy Decoder 610 and the Filter 626 performs an in-loop filtering operation across or not across tile group boundaries according to the flag. In one embodiment, another flag is also parsed by the Entropy Decoder 610 and the Filter 626 performs the in-loop filtering operation across or not across tile boundaries according to this flag. If the currently decoded picture is a reference picture, the reconstructed video of the currently decoded picture is also stored in a Reference Picture Buffer 628 for later pictures in decoding order.

Various components of Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control receiving of input data associated with a current video picture. The processor is equipped with a single or multiple processing cores. In some examples, the processor executes program instructions to perform functions in some components in the Encoder 500 and Decoder 600, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 5 and 6, the Encoder 500 and Decoder 600 may be implemented in the same electronic device, so various functional components of the Encoder 500 and Decoder 600 may be shared or reused if implemented in the same electronic device. For example, one or more of the Reconstruction module 528, Inverse Transformation module 526, Inverse Quantization module 524, In-loop Processing Filter 530, and Reference Picture Buffer 532 in FIG. 5 may also be used to function as the Reconstruction module 620, Inverse Transformation module 624, Inverse Quantization module 622, In-loop Processing Filter 626, and Reference Picture Buffer 628 in FIG. 6, respectively.

Embodiments of the video data processing method partitioning video pictures into rectangular tile groups may be implemented in a circuit integrated into a video compression chip or program codes integrated into video compression software to perform the processing described above. For examples, grouping tiles into rectangular tile groups may be realized in program codes to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of processing video data in a video coding system, comprising:
   receiving input data associated with a current video picture;
   dividing the current video picture into non-overlapping rectangular tiles;
   grouping the tiles in the current video picture into a plurality of tile groups, wherein each of the plurality of tile groups includes an integer number of tiles of the current video picture that are exclusively contained in a single network abstraction layer (NAL) unit having a size that is configured for output and delivery after encoding, and wherein shapes of a set of tile groups including two or more of the plurality of tile groups are constrained to be a rectangle of one shape, and the integer number is greater than one;
   signaling or parsing a first flag indicating whether one or more filter operations are performed across tile group boundaries between the tile groups; and
   encoding or decoding video data in the plurality of tile groups within the current video picture based on the first flag.

2. The method of claim 1, wherein the integer number of tiles within each tile group are processed in a raster scan order.

3. The method of claim 1, wherein each tile contains a predetermined number of Coding Tree Units (CTUs).

4. The method of claim 1, further comprising:
   performing the one or more filtering operations across the tile group boundaries between the tile groups in the current video picture when the first flag specifies the one or more filtering operations are performed across the tile group boundaries between the tile groups; and
   performing the one or more filtering operations only within each tile group when the first flag specifies the one or more filtering operations are not performed across the tile group boundaries between the tile groups.

5. The method of claim 1, wherein the one or more filtering operations include one or a combination of deblocking filter, sample adaptive offset filter, and adaptive loop filter operations.

6. The method of claim 1, wherein the first flag is signaled in or parsed from a sequence level, a picture level, or a slice level of a video bitstream.

7. The method of claim 1, further comprising:
   signaling or parsing a second flag indicating whether the one or more filtering operations are performed across tile boundaries between the tiles;

performing the one or more filtering operations across the tile boundaries between the tiles in the current video picture when the second flag specifies the one or more filtering operations are performed across the tile boundaries between the tiles; and performing the one or more filtering operations only within each tile when the second flag specifies the one or more filtering operations are not performed across the tile boundaries between the tiles.

8. The method of claim 7, wherein the first flag is signaled or parsed when the second flag indicates the one or more filtering operations are performed across the tile boundaries between the tiles.

9. The method of claim 1, further comprising:
signaling or parsing a rectangular tile group flag, wherein all the tile groups are either constrained to have rectangular shapes when the rectangular tile group flag is true or are not constrained to have rectangular shapes when the rectangular tile group flag is false.

10. The method of claim 9, wherein
a size of each tile group is signaled or derived using two syntax elements when the rectangular tile flag is true, the two syntax elements of each tile group representing a width and a height of the respective tile group, respectively, and
the size of each tile group is signaled or derived using one syntax element when the rectangular tile flag is false, the syntax element of each tile group representing a number of tiles within the respective tile group.

11. The method of claim 1, wherein the tile groups in the current video picture are not constrained to have a same size.

12. The method of claim 1, further comprising:
signaling or parsing two syntax elements for each tile group, one of the two syntax elements representing a width of the respective tile group in a first number of tiles, and the other one of the two syntax elements representing a height of the respective tile group in a second number of tiles.

13. A method of processing video data in a video coding system, comprising:
receiving input data associated with a current video picture;
dividing the current video picture into non-overlapping rectangular tiles;
grouping the tiles in the current video picture into a plurality of tile groups, wherein each of the plurality of tile groups includes an integer number of tiles of the current video picture that are exclusively contained in a single network abstraction layer (NAL) unit having a size that is configured for output and delivery after encoding, and wherein shapes of a set of tile groups including two or more of the plurality of tile groups are constrained to be a rectangle of one shape, and the integer number is greater than one;
signaling or parsing a first flag indicating whether one or more filtering operations are performed across tile group boundaries between the tile groups;
performing the one or more filtering operations across the tile group boundaries between the tile groups in the current video picture when the first flag specifies the one or more filtering operations are performed across the tile group boundaries between the tile groups;
performing the one or more filtering operations only within each tile group when the first flag specifies the one or more filtering operations are not performed across the tile group boundaries between the tile groups; and
encoding or decoding video data in the plurality of tile groups within the current video picture.

14. The method of claim 13, wherein the one or more filtering operations include one or a combination of deblocking filter, sample adaptive offset filter, and adaptive loop filter operations.

15. The method of claim 13, wherein the first flag is signaled in or parsed from a sequence level, a picture level, or a slice level of a video bitstream.

16. The method of claim 15, further comprising:
signaling or parsing a second flag indicating whether the one or more filtering operations are performed across tile boundaries between the tiles;
performing the one or more filtering operations across the tile boundaries between the tiles in the current video picture when the second flag specifies the one or more filtering operations are performed across the tile boundaries; and
performing the one or more filtering operations only within each tile when the second flag specifies the one or more filtering operations are not performed across the tile boundaries between the tiles.

17. The method of claim 16, wherein the first flag is signaled or parsed when the second flag indicates the one or more filtering operations are performed across the tile boundaries between the tiles.

18. The method of claim 13, wherein at least another set of tile groups in the plurality of the tile groups in the current video picture includes raster scan tile groups or rectangular tile groups, shapes of the rectangular tile groups being constrained to be rectangle or square.

19. An apparatus of processing video data in a video coding system, the apparatus comprising one or more electronic circuits configured for:
receiving input data associated with a current video picture;
dividing the current video picture into non-overlapping rectangular tiles;
grouping the tiles in the current video picture into a plurality of tile groups, wherein each of the plurality of tile groups includes an integer number of tiles of the current video picture that are exclusively contained in a single network abstraction layer (NAL) unit having a size that is configured for output and delivery after encoding, and wherein shapes of a set of tile groups including two or more of the plurality of tile groups are constrained to be a rectangle of one shape, and the integer number is greater than one;
signaling or parsing a first flag indicating whether one or more filter operations are performed across tile group boundaries between the tile groups; and
encoding or decoding video data in the plurality of tile groups in the current video picture based on the first flag.

20. The method of claim 1, wherein the plurality of tile groups includes a first set of tile groups including two or more tile groups that are different from the set of tile groups in the plurality of tile groups that is constrained to be the rectangle of the one shape, and at least one of the first set of tile groups has a shape that is different from the one shape.

21. The method of claim 20, wherein each of the plurality of tile groups includes a same number of tiles.

* * * * *